United States Patent [19]

Herrin

[11] Patent Number: 4,798,910
[45] Date of Patent: Jan. 17, 1989

[54] PROCESS SEQUENCING FOR AMINE REGENERATION

[76] Inventor: J. Pearman Herrin, 2703 Oak Bluff, San Antonio, Tex. 78230

[21] Appl. No.: 921,630

[22] Filed: Oct. 21, 1986

Related U.S. Application Data

[63] Continuation-in-part of Ser. No. 696,253, Jan. 29, 1985, abandoned.

[51] Int. Cl.⁴ .............................................. C07C 85/26
[52] U.S. Cl. ...................................... 564/497; 423/228; 423/229
[58] Field of Search ................. 564/497; 423/228, 229

[56] References Cited

U.S. PATENT DOCUMENTS

| | | | |
|---|---|---|---|
| 3,362,891 | 1/1968 | Meyers | 203/59 |
| 4,198,378 | 4/1980 | Giammarco et al. | 423/228 |
| 4,367,258 | 1/1983 | Lagana et al. | 423/228 |
| 4,405,811 | 9/1983 | Stogryn et al. | 423/228 |

Primary Examiner—Glennon H. Hollrah
Assistant Examiner—John A. Sopp
Attorney, Agent, or Firm—Thomas E. Sisson

[57] ABSTRACT

An improved method for amine regeneration wherein a rich amine out of a first heat exchanger is temperature controlled prior to transfer to a second heat exchanger. At least a portion of the hot overhead gasses exiting from a stripping still are transferred to the second heat exchanger. Temperature controlled heated rich amine liquid passes through the second exchanger and contacts the hot overhead gasses. The rich amine liquid is increased in higher temperature thereby and then is transferred to yet a third exchanger and finally to the stripping still for regeneration of lean amine. The reduced temperature overhead gasses are transferred to the reflux condensor for final cooling.

3 Claims, 4 Drawing Sheets

PROCESS SEQUENCING FOR AMINE REGENERATION

BACKGROUND OF THE INVENTION

This application is a continuation-in-part of U.S. patent application Ser. No. 696,253, filed Jan. 29, 1985.

This invention relates to a process for an improved regeneration of amine in an absorption-type gas treatment process.

Many natural gases contain hydrogen sulfide ($H_2S$) and carbon dioxide ($CO_2$), commonly called acid gases, that must be removed prior to sales or processing. The removal of sulfur compounds from these acid gasses or "sour gasses" is oftentimes calle "sweetening."

There are generally two types of gas treating processes: (a) absorption and (b) adsorption. In absorption processes, the gas stream contacts a liquid that selectively removes acid gases. The most common absorption process is the amine process. The liquid absorbent is a mixture of water and a chemical amine, usually monoethanol-amine (MEA) or diethanolamine (DEA). Sometimes triethanol-amine (TEA), diglycolamine (DGA), and methyl-diethanolamine (MDEA), diisoprophylamine, sulfanol and solutions of these, with special additives to improve efficiencies, are utilized.

Hydrogen sulfide is a toxic gas that must be removed to extreme low concentrations (less than 0.25 grains of $H_2S$ per 100 standard cubic feet) prior to pipeline delivery. When mixed with free water it forms a weak acid that can cause corrosion.

Carbon dioxide is a non-toxic inert gas. Carbon dioxide, as such, is harmless in dry natural gas but when mixed wtih free water will form a weak acid and also cause corrosion. Inlet gas to cryogenic plants that contain concentrations of $CO_2$ in excess of 0.75 to 1.0 percent $CO_2$ may cause freezing problems. The $CO_2$ will freeze to a solid ice in a turbo expander plant demethanizer where it may plug lines and even plug the tower itself. Often flooding of the demethanizer results from carbon dioxide freezing within the tower.

When the plant inlet gas contains concentrations of carbon dioxide too high to process, all of the gas may be treated or part of the gas may be separated into a side stream and treated by an amine plant. Principally all the carbon dioxide is removed in the amine plant. When the side stream is processed, and sufficient gas is treated, it is blended back with the untreated gas, thus yielding a carbon dioxide content of the blended stream which is low enough for processing.

Diethanolamine (DEA) is the most common amine used in plants operating at pressures above 300 psig. Monoethanolamine (MEA), a stronger base chemical, is commonly used for pressures below 300 psig. When pressures are sufficiently high, DEA is preferred and will require lower circulation rates, less heat input, and fewer corrosion problems than experienced with MEA.

Amines remove carbon dioxide and hydrogen sulfide by a chemical reaction that changes the chemical form of both the amine and the acid gases. The new chemical changes the acid gases to a liquid form which is separated from the acid-free gas or sweetened gas. The chemical reaction between amine (called lean amine at the start of the process) and acid gases gives off heat when the reaction takes place. The sweet residue gas flows out the top of a contactor or absorber and the reacted amine (also called rich amine) flows out the bottom and is generally higher in temperature than the inlets. Lean amine is regenerated by reducing the pressure and adding heat to the rich amine.

The present invention focuses on the lean amine regeneration process. The solution regeneration generally takes place in a low pressure still with a reboiler at the bottom to furnish heat to the solution. The still is generally a bubble tower containing either trays or packing. The rich amine liquid containing the sour gasses ($CO_2$ and $H_2S$) is injected into the still near the top and flows down the tower while steam generated in the reboiler flows up the tower countercurrent to the descending rich amine. The steam aids in "stripping" the sour gasses from the rich amine liquid and sends them back up the tower and out the top of the tower.

The heat added to the still reboiler increases the temperature of the amine somewhat, but most of the heat goes into generating steam which, in turn, flows into and up the still. This heat added or inputted into the reboiler must be furnished from an outside source such as steam from another process, hot oil or hot glycol circulated through the reboiler, or fuel directly fired into the reboiler.

When sour gasses pass out the top of the still, a large amount of steam also goes out with the gas. This overhead steam and gas stream (called overhead) is generally higher in temperture than the feed to the top of the still. It has not been recognized in operating industry heretofore that this overhead has enormous amounts of available and recoverable thermal energy. In the normal amine unit the gasses and steam out the top of the still flow to condenser (called a reflux condenser) where the sour gasses are cooled to near ambient temperatures and most of the steam condenses into water. This condensing step requires considerable amounts of energy, and the heat removed is generally wasted to air.

U.S. Pat. No. 3,362,891 discloses that the overhead may be used to heat relatively cool rich amine (90° F.), thereby giving up some heat and condensing as reflux. However, nothing in U.S. Pat. No. 3,362,891 teaches the enormous energy savings available by proper temperature control of the overhead in relation to the temperature of the feed to the stripper still. Further, U.S. Pat. No. 3,362,891 does not disclose the hea exchange sequencing of the instant invention.

The present invention is a process for maximizing heat savings in the conventional amine regeneration process. By controlling outlet temperature of still feed from the conventionally utilized heat exchanger, immediately downstream of the contactor; exchanging heat from the still overhead gasses to the rich amine still feed; and, subsequent, further heat exchange of the feed with the hot lean amine discharged from the bottom of the still, enormous heat savings may be realized. The unique exchanger sequencing and temperature control features of the instant process distinguish this invention. The amount of heat saved in the instant processing reduces the amount of outside heat that must be added to the reboiler. This reduction of reboiler heat input is a direct savings in fuel costs. With some plants savings as much as thirty percent of the total reboiler duty should b experienced.

SUMMARY OF THE INVENTION

The present invention is a significant modification to the conventional or typical amine regeneration process. Additional steps to the amine regeneration process include: first, controlling the outlet temperature range of the rich amine still feed from the conventionally utilized heat exchanger immediately downstream of the contactor; secondly, the controlled temperature transferring of all or a portion of the hot overhead gasses exiting from a stripping still through a conduit to a heat exchange unit while flowing into the heat exchange unit temperature controlled rich amine liquid; and, thirdly, controlling a heat exchange subsequent to the still overhead heat exchange, whereby heat is transferred from the hot lean amine out of the bottom of the still to the higher temperature rich amine feed immediately prior to the feed entering the still. There is a transfer of thermal energy (either directly or indirectly) in the instant process to the rich amine liquid resulting in a higher temperature rich amine liquid flowing into the stripper still. Reduced temperature overhead gasses are then transferred to a condenser for final cooling of the acid gasses and water and reduced temperature lean amine is eventually returned to the contractor. This invention reduces the heat input necessary to the reboiler for developing steam in the stripper still. It has been found that when the rich amine liquid temperature immediately prior to entry into the still is raised from the normal operating range of 170° F. to a temperature range of 190° F. to 210° F., reboiler duty is reduced by as much as 30 percent. Not only is the reboiler duty reduced, but the still condensing duty is decreased as well as is the lean amine cooler duty.

DETAILED DESCRIPTION OF THE PREFERRED EMBODIMENT

While there will be shown and described and pointed out fundamental novel features of the invention as applied to a preferred embodiment thereof, it will be understood that various omissions and substitutions and changes in the form and details of the process illustrated may be made by those skilled in the art without departing from the spirit of the invention. It is the intention, therefore, to be limited only as indicated by the scope of the claims appended hereto.

Figure 1:
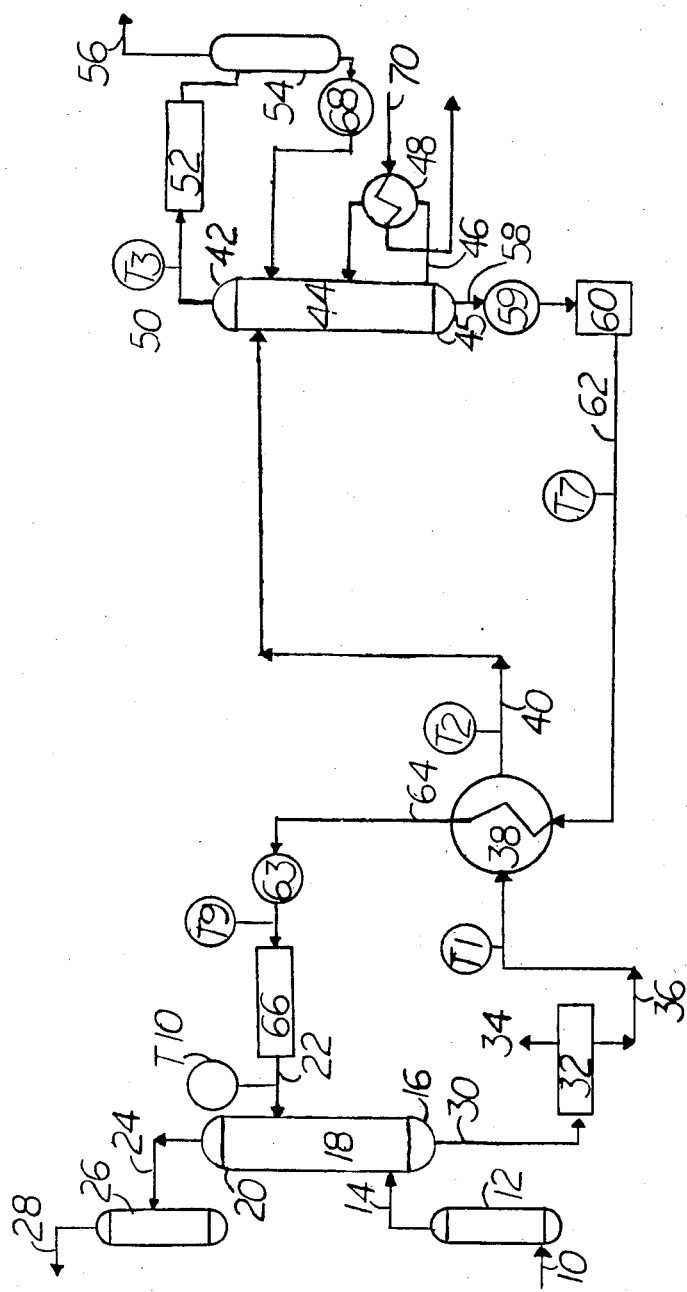
FIG. 1 is a flow diagram of the typical amine process.

The basic amine flow diagram is shown in FIG. 1. Sour gas, i.e., natural gas having high concentrations of hydrogen sulfide and carbon dioxide, flows through a conduit 10 and then through a scrubber 12 to remove particular matter with the discharge conduit 14 of the scrubber 12 entering the bottom 16 of the contactor or absorber 18 and contacts the lean amine solution, which enters at the top 20 of the absorber 18 via conduit 22. The gasses rise through the vertical contactor 18 and then react with the lean amine in a countercurrent direction. The gas bubbles through the amine whereby the chemical reaction takes place, removing the acid gasses and allowing the sweet natural gas to leave the top of the absorber through conduit 24. These sweet gasses again pass through a scrubber 26 and out conduit 28 on to the main gas pipeline. The countercurrent flow is important as it allows the leanest (purest) amine to contact the leanest (sweetest) gas at the top and the richest (contaminated) amine to contact the richest (contaminated) sour gas at the bottom.

The rich amine leaves the bottom 16 of the tower 18 in the temperature range of 120° F.–160° F. and flows through conduit 30 to a flash tank 32. Flash tank vapors are sent via pipeline 34 to the fuel system and are usually sour. From the flash tank 32, the amine stream goes through conduit 36 to a heat exchanger 38 where the stream temperature is raised to approximately 170°–190° F. The stream then flows through feed line 40 to the top section 42 of the regeneration stripper 44 (the still). The still bottoms pass through conduit 46 and are heated in the reboiler 48. The still reboiler 48 heats the amine and water solution in the bottom of the still 44 to about 240° F. at about 5 psig. pressure. The heat converts some of the water in the amine solution to steam. The steam rises through the still and heats the counterflowing rich amine solution. This heat releases the acid gasses, and the excess steam and acid gasses pass out of the top of the still 44 through conduit 50. The steam and acid gasses then enter the reflux condenser 52 where the steam is condensed, separated in accumulator 54 and pumped back to the still 44. The acid gasses leave the separator or accumulator 54 and go either to a flare stack or a sulfur recover plant (not shown) via conduit 56.

The hot lean amine leaves the bottom 45 of the still 44 via line 58, is filtered in filter 60, and flows back through pipeline 62 to heat exchanger 38 and then is pumped by pump 63 through conduit 64 to lean amine cooler 66. From cooler 66, the cooled lean amine solution is pumped through conduit 22 to the top 20 of the contactor 18.

The primary purpose of the hot, lean amine passing through exchanger 38 is to reduce the lean amine temperature while raising the rich amine temperature. The lean amine heat exchange at exchanger 38 is to ensure cool amine to the contactor 18 since the chemical reaction of removing the acid gasses proceeds best at inlet gas and lean amine temperatures between 85° F. and 120° F. However, this transfer of heat only raises the rich amine temperature to a range of approxiately 170°–190° F. There simply is not enough eneryy in the hot amine stream at this particular point in its flow path to raise the rich amine temperature any higher.

The purpose of the still overhead condensor 52 is to cool the stripped acid gasses and condense steam from the still 44 to conserve water. The overhead gasses could be sent to the flare while hot; however, a considerable amount of water would be lost from the system, requiring a large make-up supply. By cooling the overhead to 120° F. or less, a large part of the steam condenses to water and is separated in the reflux accumulator 54. Because of the enormous amount of thermal energy available in the steam, the condensor 52 has a significant work load. The separated water, called reflux, is pumped via pump 68 back into the amine system either into the lean amine stream, into the still feed, or to the top 42 of the still 44 (as shown in FIG. 1).

Stripping of the amine in the still 44 is of critical importance. Lean amine improperly stripped will produce off specification gas from the contactor 18. If the lean amine is not stripped sufficiently in the still 44, acid gas left in the amine solution will be stripped out by the main gas stream at the top 20 of the contactor 18, thereby causing the gas leaving the contactor 18 to be off specification. The most common way to solve a condition of high residual acid gas in the lean amine is to increase the heat being supplied via conduit 70 to the still reboiler 48. Unfortunately, this results in an increased consumption of reboiler fuel, or in the cases where steam is used within the reboiler 48, additional steam must be supplied to generate higher temperatures within the stripper still 44.

Figure 2:
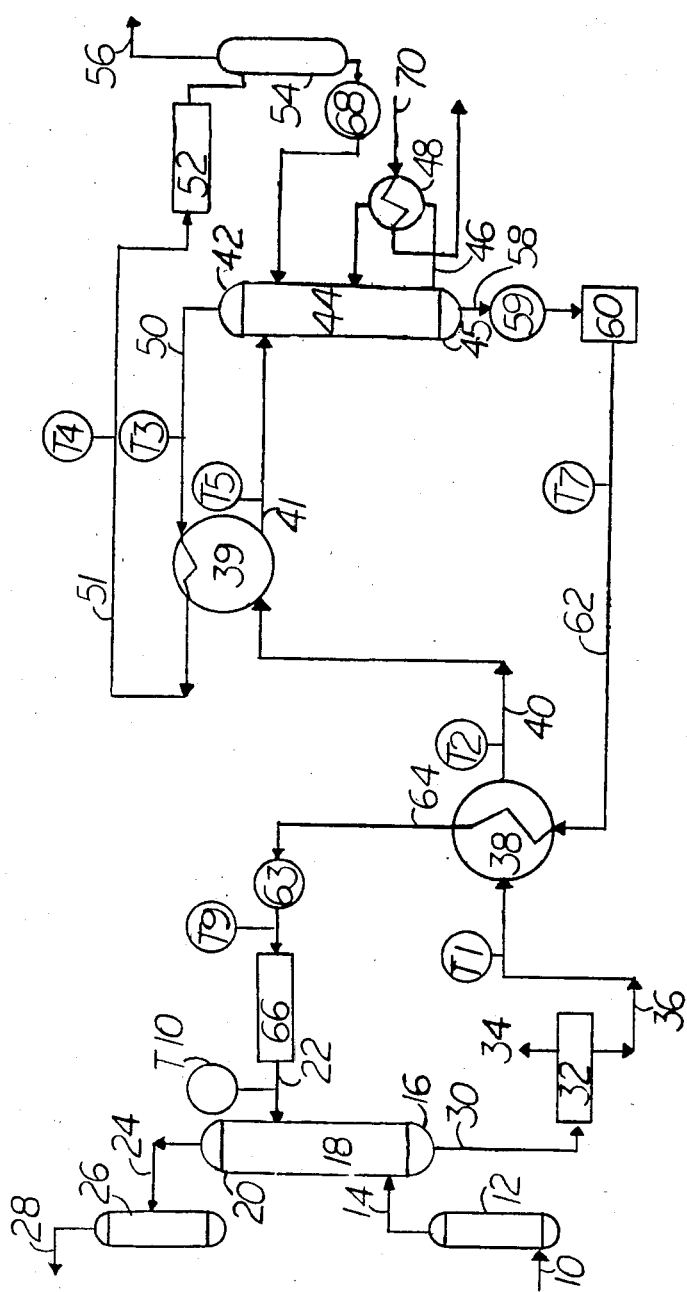
FIG. 2 is a flow diagram of the modified amine process of the present invention with an indirect contact exchange.

FIG. 2 illustrates a modified amine process of the present invention. Instead of the rich amine flow discharged from the exchanger 3 flowing directly from conduit 40 into the top 42 of the stripper still 44, the flow is diverted through heat exchanger 39. Heat exchanger 39 may be an indirect contact type exchanger or the direct contact type. FIG. 2 illustrates heat exchanger 39 to be an indirect contact type wherein the rich amine flow would indirectly contact the hot overhead gasses as discussed below.

Thermal energy is transferred from hot overhead gasses exiting from the top 42 of the stripping still 44 through conduit 50 to heat exchanger 39. Within heat exchanger 39 thermal energy is transferred from hot overhead gasses to the rich amine liquid. Therefore, while the temperature T2 of the output of a conventionally utilized exchanger 38 is generally in the approximate range of 170° F. to 190° F., T5, the temperature of the input into the still 44 in the modified amine process of the present invention of FIG. 2 is in the approximate temperature range of 190° F. to 210° F.

The overhead gasses from the still 44 via conduit 50 are in the approximate temperature range of 210° F. to 220° F. as shown on temperature indicator T3 but contain an enormous amount of thermal energy in the form of latent heat of condensation. When these hot overhead gasses are transferred to heat exchanger 39, this enormous amount of latent heat is transferred to the rich amine flow.

Steam condensing from the vapor phase to the liquid phase at constant temperure gives up considerably more heat than can be removed from either the vapor steam or liquid water. At atmospheric pressure, one pound of steam condensing from a vapor to a liquid will give up 970.3 BTU's. One pound of liquid water requires one BTU to raise the temperature of the water 1° F. Thus, the amount of heat transferred from one pound of condensing steam at a constant temperature is sufficient heat to raise the temperature of one pound of water 970.3° F.

Figure 4:
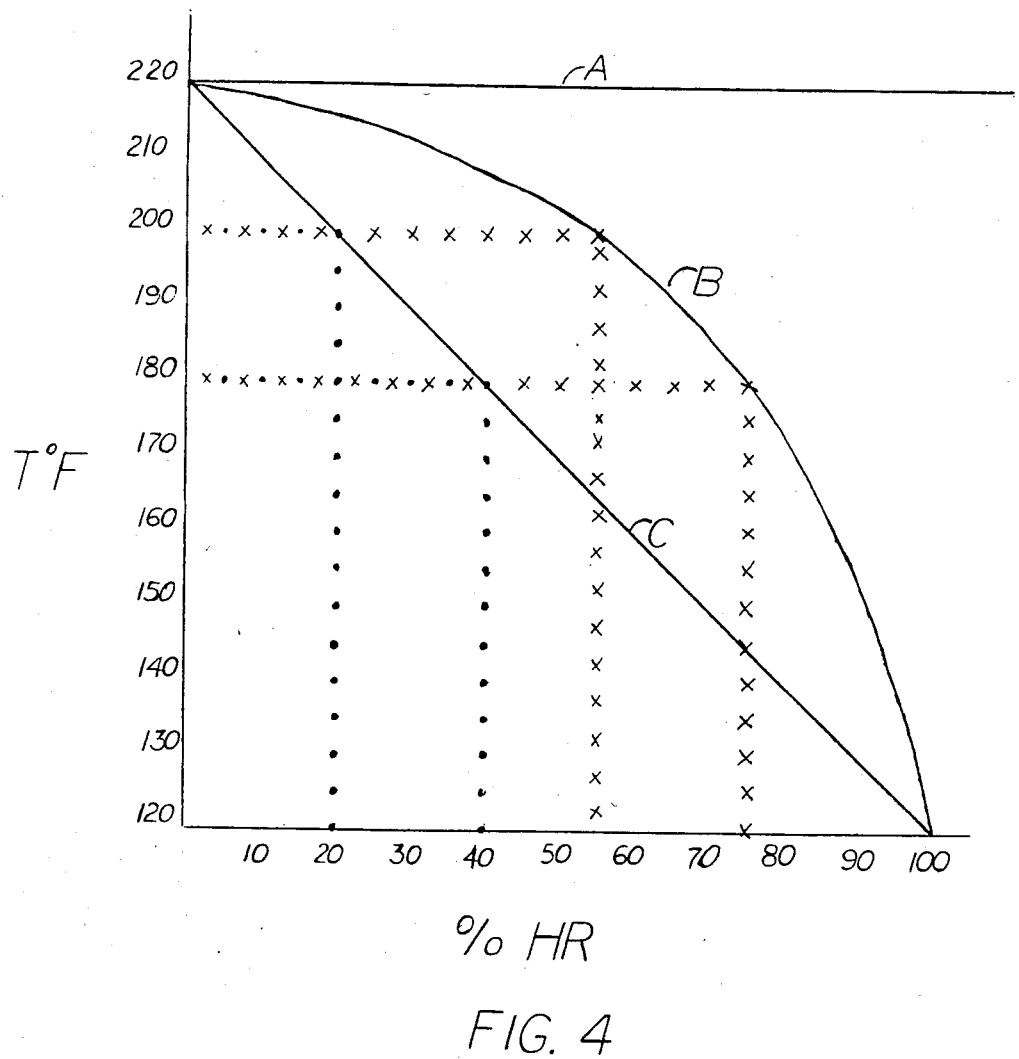
FIG. 4 is an amine still overhead condensing curve.

FIG. 4 is a chart showing an amine still overhead condensing curve. T° F. represents temperature in degrees and % HR represents percent of heat removed. From FIG. 4 it can be seen that pure steam (curve A) gives up 100% of its latent heat in condensing to a liquid without a temperature change. The still overhead (curve B), made up of acid gas and steam, gives up approximately 55% of its heat in going from 220° F. to 200° F. and gives approximately 77% of its heat in going from 220° F. to 180° F. Curve C shows that the cooling of acid gas only gives up 20% of its heat in going from 220° F. to 200° F. and less than half (40%) of its heat in going from 220° F. to 180° F. This tremendous difference in available heat has not been recognized in the industry.

In the industry the still overhead is recognized as mainly acid gas and is commonly called "acid gas"; and even though the overhead has been used to heat the still feed as shown in U.S. Pat. No. 3,362,891, it has not been readily evident in the industry there is such a large amount of steam carrying overhead of the still with the acid gas and that this steam can be condensed at sufficiently high enough temperature for the heat to be added to the still feed The reduced temperature T4 overhead gas exiting exchange 39 via conduit 51, having an approxiamte temperature range of 160° F.-200° F., is then transferred to the conventional condensor unit 52 and separator 54 for separation into reflux and acid gas. Because the overhead gas has given up much of its energy in the heat exchange with the rich amine liquid, less energy is utilized in the condensor unit 52 of this inventive process than in the conventional amine process. Further, since the inlet temperature T2 of the rich amine into the still 4 is higher than with the conventional methods, less outside heat has to be supplied to the reboiler 48 in order to generate the proper operating temperatures within the stripper still 44.

Figure 3:
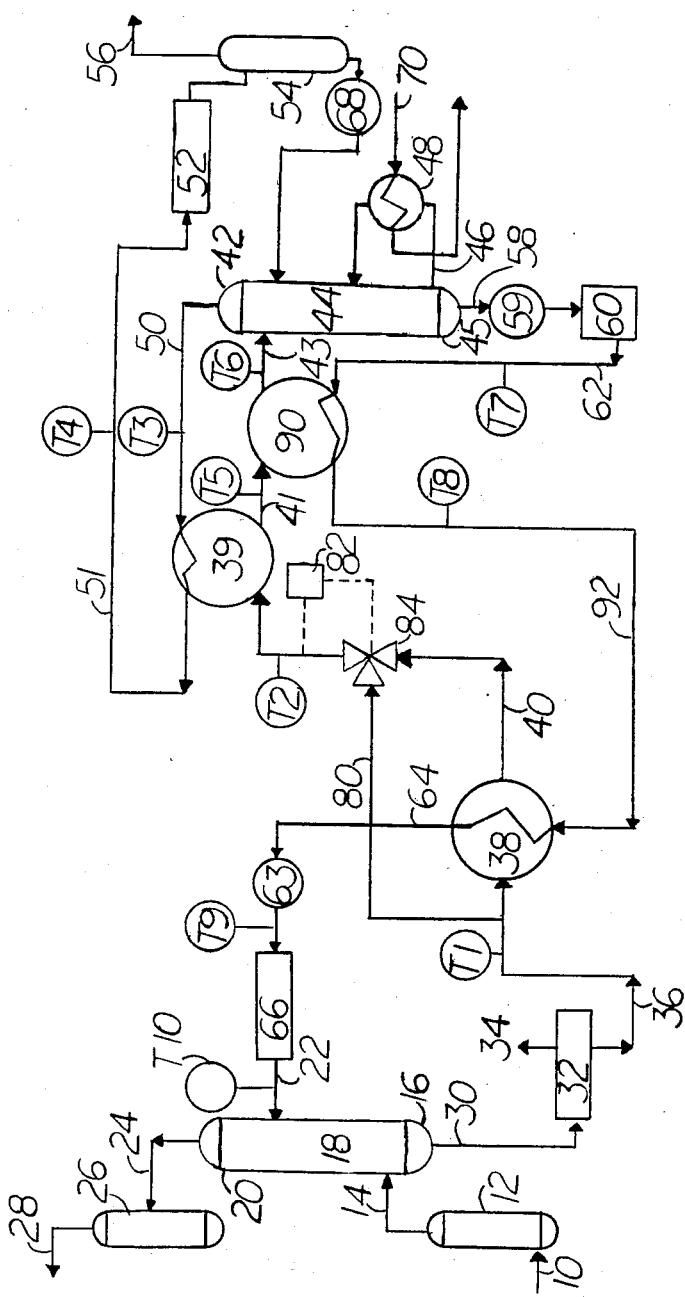
FIG. 3 is a flow diagram of a modified amine process of the present invention showing the temperature controll bypass and hot lean amine to feed exchange.

FIG. 3 illustrates an embodiment of the instant process which further increases the heat and energy savings over the conventional amine regeneration process. As with the processes of FIGS. 1 and 2, rich amine from contactor 18 flows through conduit 36 to exchanger 38. However, as shown in FIG. 3, a temperature controlled bypass line 80 branches off conduit 36 upstream of exchanger 38.

A temperature controller 82, as it is commonly known in the art, senses and compares with a predetermined temperature the temperature of rich amine in conduit 40 upstream of exchanger 39. Controller 82 opens and closes bypass control valve 84 in response to the temperature of rich amine sensed in conduit 40. In the process of FIG. 3, it is critical to control the rich amine temperature to exchanger 39, so that maximum heat savings are achieved throughout the entire process, as will be discussed below. The temperature of rich amine into exchanger 39 will effect the transfer of heat from the overhead gasses out of the top 42 of still 44 to the rich amine. Further, the temperature of the rich amine to exchanger 39 effects the outlet temperature of the overhead passing through conduit 51 to condenser 52.

The temperature of rich amine in conduit 41 out of exchanger 39 is sensed at temperature indicator T5. The rich amine out of exchanger 39 flows through conduit 41 to a final exchanger 90. In exchanger 90 heat is transferred from the hot lean amine from the bottom 45 of still 44 to the rich amine coming out of exchanger 39. Hot lean amine from still 44 flows through output conduit 58, pump 59, filter 60, and conduit 62 to exchanger 90. The temperature of hot lean amine in conduit 62 is sensed by temperature indicator T7.

The hot lean amine in conduit 62 is generally in the temperature range of 240° F. As previously stated the temperature of the rich amine out of exchanger 39 is in the range of 210° F., always less than the 240° F. temperature of rich amine from still 44 in conduit 62. Therefore, by the heat exchange sequencing of the present invention, the best exchange from the hot lean amine to the rich amine feed at exchangers 90 and 38 is much more efficient than has been previously experienced in the conventional amine process utilizing an exchanger 38. Rich amine out of exchanger 90 passes through conduit 43, is temperature sensed by temperature indicator T6, and passes into still 44 at a temperature in the range of 200° F. to 220° F. or more.

The hot lean amine flows out of exchanger 9 through conduit 92 to exchanger 38. Temperture indicator T8 senses the lean amine temperature in conduit 92. While the inlet temperature of lean amine entering exchanger 38 is lower than is normally found in the conventional amine process (215° F. versus 240° F.), it is still sufficiently high to raise the temperature of rich amine from an inlet temperature of approximately 130° F. to an outlet (from exchanger 38) to approximately 185° F. The amount of heat recovered from the lean amine in the two exchangers 90 and 38 will be equal to or greater than that recovered from exchanger 38 in the standard process of FIG. 1. As has been previously stated it is critical to the instant invention process that the rich amine temperature out of exchanger 38 be controlled; thus, the purpose of the temperature bypass system including conduit 80, controller 82, and valve 84.

Further, the temperature bypass system allows for controlling the lean amine temperature to cooler 66

(4) Amine net acid gas pick-up:
  (a) 0.54 mols acid gas per mol amine
  (b) 5.0 cu. ft. acid gas per gal amine solution
(5) Amine still reflux rate=2.5 mols reflux per mol acid gas removed.

Numbers and amounts for the process of U.S. Pat. No. 3,362,891 are based upon extracting the same 100,000 std. cu. ft. per hour acid gas with all other conditions the same as given in the '891 patent. Further, in the '891 example T1 is the temperature of rich amine out of contactor; T2 is temperature of rich amine entering stripper still; T3 is temperature overhead gasses to condenser; T4 is temperature of overhead gasses out of condenser; and T7 is temperature of hot lean amine out of stripper.

TABLE 1

| °F. | Standard Process of FIG. 1 | Process of U.S. Pat. No. 3,362,891 | Modified Process of FIG. 2 | Temperature controlled process of FIG. 3 | | | | | |
|---|---|---|---|---|---|---|---|---|---|
| | | | | Case 1 | Case 2 | Case 3 | Case 4 | Case 5 | Case 6 |
| T1 | 130 | 90 | 130 | 130 | 130 | 130 | 130 | 130 | 130 |
| T2 | 185 | 199 | 185 | 155 | 165 | 175 | 185 | 195 | 200 |
| T3 | 215 | 210 | 215 | 215 | 215 | 215 | 215 | 215 | 215 |
| T4 | — | 140 | 190 | 160 | 170 | 180 | 190 | 200 | 205 |
| T5 | — | — | 210 | 210 | 210 | 210 | 210 | 210 | 210 |
| T6 | — | — | — | 220+ | 220+ | 220+ | 220+ | 220+ | 220+ |
| T7 | 240 | 235 | 240 | 240 | 240 | 240 | 240 | 240 | 240 |
| T8 | — | — | — | 215 | 215 | 215 | 215 | 215 | 215 |
| T9 | 155 | — | 182 | 189 | 178 | 168 | 157 | 146 | 141 |
| T10 | 120 | unk | 120 | 120 | 120 | 120 | 120 | 120 | 120 |
| Reboiler Duty MBTU/Hr | 24,072 | 46,859 | 19,582 | 18,126 | 16,929 | 16,112 | 15,669 | 15,919 | 16,620 |
| Heat wasted to air MBTU/Hr | 18,265 | 41,106 | 13,659 | 12,131 | 11,035 | 10,297 | 9,797 | 10,076 | 10,772 | thereby effecting its duty. Temperature indicator T9 senses the lean amine temperature in conduit 64. Because lean amine to cooler 66 is lower in the instant invention process than in the conventional process further heat and energy savings are achieved; also the efficiency of the chemical reaction in the absorber 18 improved.

As temperature controlled rich amine flows through conduit 40 to exchanger 39, the instant process provides for controls in the heat exchange between the rich amine and the overhead gasses unlike any known amine regeneration process. In addition, controlling the temperature rich amine out of exchanger 39 into exchanger 90, results in completing the control loop back to exchanger 38.

To illustrate the significance of th reduction in reboiler 48 duty and the savings on the amount of heat wasted in air achievable in the instant inventive process, various examples follow in Table 1 which compare the standard amine regeneration process (FIG. 1 process), the process of U.S. Pat. No. 3,362,891, the modified process of FIG. 2, and the temperature controlled process of FIG. 3. The process of FIG. 3 is calculated several times to show the savings which are achievable by varying the temperature controlled bypass system. The following assumptions or conditions are made within all of the examples illustrated:
(1) Amine unit removing 100,000 std. cu. ft. per hour acid gases
(2) Amine:
  30 wt. percent diethanolamine
  70 wt. percent water
(3) Amine circulation rate: 20,000 gal per hour

I claim:
1. A conventional amine regenaration process having at least a contactor, a first heat exchanger immediately downstream of said contactor, a stripper still, an overhead gas condenser, a lean amine cooler and a still reboiler comprising the additional steps of:
  a first passing of rich amine liquid from the bottom of said contactor through said first heat exchanger said first exchanger not dispositioned on top of said stripper still;
  transferring at least a portion of hot overhead gasses exiting the top of said stripper still to a second exchanger said second heat exchanger not dispositioned on top of said stripper still;
  controlling by a temperature control means the temperature of a heated rich amine liquid into said second heat exchanger;
  a second passing of said temperature controlled heated rich amine liquid through said second exchanger wherein said hot overhead gasses transfer thermal energy to said temperature controlled heated rich amine liquid resulting in a higher temperature rich amine and reduced temperature overhead gasses;
  transferring said reduced temperature overhead gasses to said overhead gas condenser for separation into acid gasses and water;
  a first transferring hottest lean amine from the bottom of said stripper still to a third heat exchanger;
  a third passing of said higher temperature rich amine liquid through said third heat exchanger wherein said hottest lean amine from said bottom of said stripper still transfers thermal energy to said higher temperature rich amine liquid resulting in a highest temperature rich amine and hot temperature lean amine;

transferring said highest temperature rich amine liquid into said top of said stripper still for contacting steam generated within said still;

a second transferring said hot temperature lean amine to said first heat exchanger wherein said hot temperature lean amine transfers thermal energy to said rich amine liquid resulting in said heated rich amine liquid and a lower temperature lean amine;

a third transferring said lower temperature lean amine to said lean amine cooler;

said steps of first, second, and third transferring occurring in successive sequential order; and said steps of first, second, and third passing occurring in successive sequential order, whereby a reduction in the heat requirement is obtained at said still reboiler.

2. The process of claim 1 wherein said temperature control means comprises means for allowing at least a portion of said rich amine to bypass said first heat exchanger and flow directly to said second heat exchanger.

3. The process of claim 1 wherein said temperature controller means controls said temperature of said heated rich amine liquid to said second heat exchanger at approximately 185° F., said higher temperature rich amine liquid to said third heat exchanger at approximately 210° F., said highest temperature rich amine liquid to said stripper still at above 220° F., said hottest temperature lean amine to said third heat exchanger at approximately 240° F., said hot temperature lean amine to said second heat exchanger at approximately 215° F., and said lower temperature lean amine to said lean amine cooler at approximately 157° F.

* * * * *